United States Patent

Zalewski et al.

[11] Patent Number: 5,647,652
[45] Date of Patent: Jul. 15, 1997

[54] DUAL-HINGED CENTER CONSOLE

[75] Inventors: Kenneth E. Zalewski, Utica; Gary D. Guichard, Farmington Hills, both of Mich.

[73] Assignee: Chrysler Corporation, Auburn Hills, Mich.

[21] Appl. No.: 575,306

[22] Filed: Dec. 20, 1995

[51] Int. Cl.⁶ .......................... A47B 88/00; E05D 15/50
[52] U.S. Cl. .......... 312/324; 312/235.6; 49/193; 16/232; 108/44; 224/539
[58] Field of Search ................ 312/235.6, 324, 312/235.2, 328; 297/188.14, 188.19; 49/193; 108/44, 45; 224/42.11, 275, 539; 296/37.8; 220/333; 16/230, 231, 232, DIG. 23

[56] References Cited

U.S. PATENT DOCUMENTS

| | | |
|---|---|---|
| 3,104,131 | 9/1963 | Krone . |
| 4,568,117 | 2/1986 | McElfish et al. . |
| 4,811,518 | 3/1989 | Ladisa ................................ 49/193 |
| 5,076,641 | 12/1991 | Lindberg ............................ 312/235.6 |
| 5,085,481 | 2/1992 | Fluharty et al. . |
| 5,144,720 | 9/1992 | Aihara et al. ..................... 16/232 |
| 5,148,629 | 9/1992 | Minami ............................... 49/193 |
| 5,173,992 | 12/1992 | Aihara et al. ..................... 16/232 |
| 5,210,906 | 5/1993 | Aihara et al. ..................... 16/232 |
| 5,357,652 | 10/1994 | Yamada .............................. 49/193 X |

FOREIGN PATENT DOCUMENTS

| | | |
|---|---|---|
| 0490468A1 | 6/1992 | European Pat. Off. . |
| 0491113A1 | 6/1992 | European Pat. Off. . |
| 0491126A1 | 6/1992 | European Pat. Off. . |
| 0494496A1 | 7/1992 | European Pat. Off. . |
| 0495290A1 | 7/1992 | European Pat. Off. . |
| 2101276 | 4/1990 | Japan ................................ 16/232 |
| 2304186 | 12/1990 | Japan ................................ 49/193 |
| 3189249 | 8/1991 | Japan ................................ 16/232 |
| 4-238982 | 8/1992 | Japan . |
| 4216791 | 8/1992 | Japan ................................ 16/232 |
| 1555200 | 4/1990 | U.S.S.R. .......................... 220/333 |
| 8502647 | 6/1985 | WIPO ............................... 49/193 |

*Primary Examiner*—Peter M. Cuomo
*Assistant Examiner*—James O. Hansen
*Attorney, Agent, or Firm*—Margaret A. Dobrowitsky

[57] ABSTRACT

A dual-hinged center console that has a longitudinally extending cam rod retention cavity is disposed within each side wall of the center console adjacent to a lid, the cam rod retention cavity is also in axial alignment with the retention member in each side wall. Further, a cam rod is rotatably mounted in each side of the lid. Each cam rod is disposed in a corresponding cam rod retention cavity at the corresponding side wall when the lid is in a closed position. When the lid is in a open position, only one cam rod is disposed in one cam rod retention cavity of the corresponding side wall. Each cam rod has a latch handle that is attached at one end of the cam rod. Upwardly rotating the attached latch handle of one of the cam rods retracts that cam rod from the retention member of the corresponding side wall. This allows the lid to be rotated about the other cam rod to an open position. Also provided in the center console is a screw cam that is disposed in each cam rod extension cavity that allows each cam rod to be removed from the cam rod retention cavity when the latch handle is upwardly rotated so that the lid is actuated toward the open position.

7 Claims, 3 Drawing Sheets

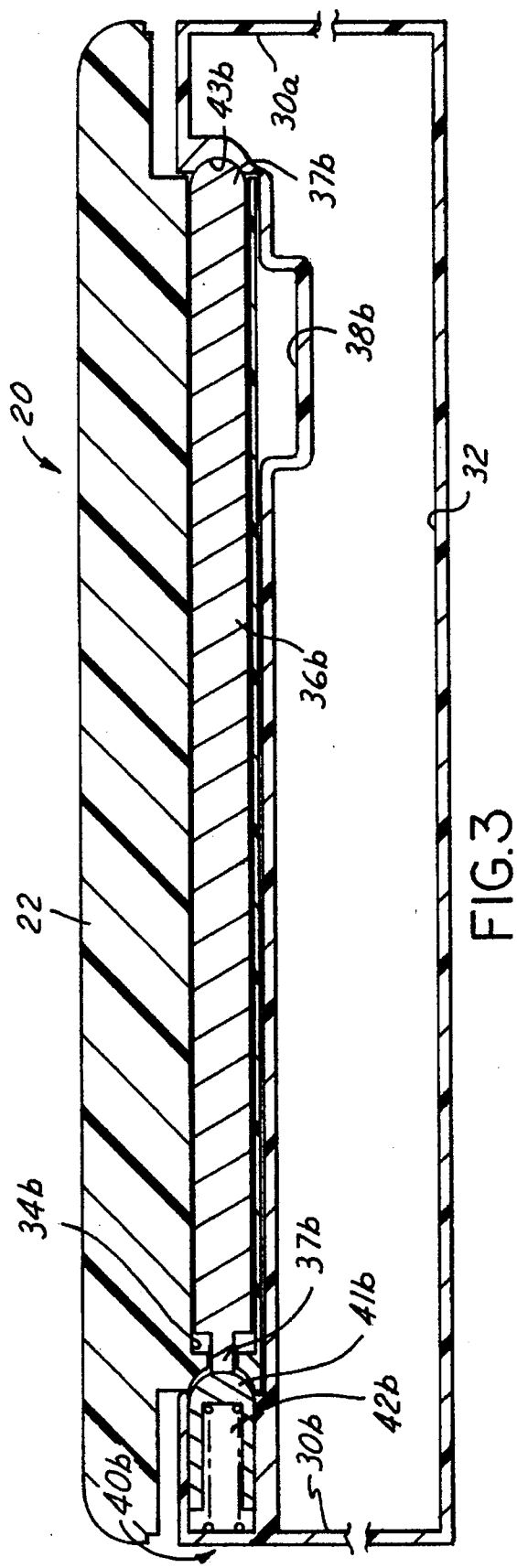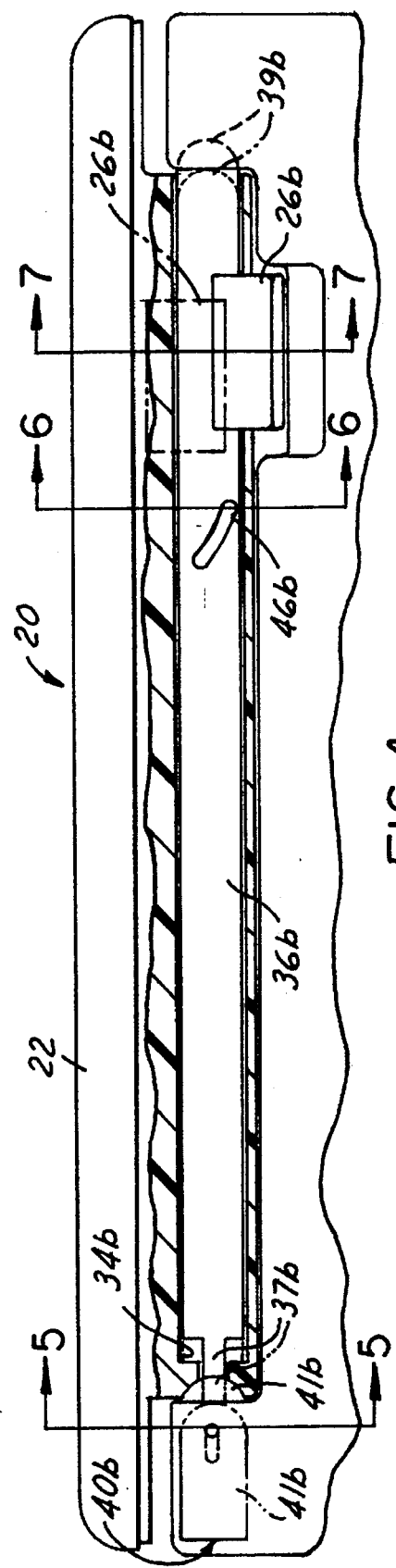

5,647,652

DUAL-HINGED CENTER CONSOLE

BACKGROUND

1. Field of the Invention

The present invention relates, generally, to vehicle storage containers. In particular, the present invention relates to a dual-hinged center console that opens from either side.

2. Description of the Related Art

Center consoles have commonly been used to store various articles of vehicle occupants. Three main types of center consoles have previously existed—those that open on one side, those that open on two sides, and those that open from the front. One sided opening consoles have a lid that opens away from the vehicle operator to allow for the removal of articles contained therein. A main disadvantage of one sided opening consoles is that it is difficult for other occupants to remove or insert articles contained therein since the lid opens toward them. Moreover, one sided opening consoles that are adapted for use on a left hand drive vehicle are difficult to be opened by an operator if used on right hand drive vehicles. This lack of adaptability is undesirable in today's global market place, which has vehicle manufactures operating in foreign countries as well as domestically.

Front opening center consoles also present difficulties in the art. These consoles have lids that swing open toward the rear of the vehicle, thereby allowing occupants on either side of the console to gain access. The main disadvantage with front opening consoles is that they are cumbersome to operate since the lid's hinge is even with or behind the occupant's shoulders. Thus, if the vehicle operator has the from seat moved forward during driving, it is difficult to move the lid to its full open position which is behind the operator's shoulders. Furthermore, when the front opening lid is in the open position the view of occupants sitting behind the center console is obstructed and they are prevented from gaining access to items contained within the console. In addition, current two sided opening consoles have complex dual-hinge mechanisms that are costly to produce and difficult to repair upon malfunction. For example: laid open European Patent Application No. 0490468A1 to Masahiro Aihara discloses a dual-hinge center console that has a hinge mechanism with magnets and ball stoppers; laid open European Patent Application No. 0494469A1 to Masahiro Aihara discloses a dual-hinge center console that has a hinge mechanism with a spring force clamping mechanism; and laid open European Patent Application No. 0495290A1 to Masahiro Aihara discloses a dual-hinge center console that has a hinge mechanism with pivotal, vertically oriented pillars and recoil springs.

It is therefore desirable in the art to have a dual-hinged center console that allows for two sided, easy opening of the center console's lid so that the console's compartment can be easily accessed from both sides thereby making the console useable on both right and left hand drive vehicles with little or no adaption.

SUMMARY OF THE INVENTION

A center console in accordance with the present invention has a bottom portion, two side walls, a front wall, a back wall, and a dual-hinged lid that is hingedly attached to both side walls in a closed position. The center console is adapted to be opened from either side so that when opened, the lid is hingedly attached to only one of the two side walls. The two side walls, the front wall, and the back wall extend upwardly from the bottom portion and are interconnected to form an enclosure for storing articles. The center console further includes a retention member disposed in each side wall adjacent to the lid and opposite a resilient plunger that is also disposed in each side wall. A longitudinally extending cam rod retention cavity is disposed within each side wall of the center console adjacent to the lid. The cam rod retention cavity is in axial alignment with, and disposed between, the retention member and the resilient plunger in each side wall. A cam rod is rotatably mounted in each side of the lid and is received in a cam rod retention cavity at the corresponding side wall when the lid is in the closed position. when the lid is open, only one cam rod is disposed in the cam rod retention cavity of the corresponding side wall. Each cam rod has a latch handle that is attached at one end of the cam rod. When a latch handle of one of the cam rods is upwardly rotated, the attached cam rod is retracted from the retention member of the corresponding side wall. This allows the lid to be rotated about the other cam rod to an open position. The center console further has a screw cam that is disposed in each cam rod extension cavity. The screw cam allows each cam rod to be removed from the cam rod retention cavity when the latch handle is upwardly rotated so that the lid is actuated toward the open position.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein:

FIG. 3 is a cross-sectional side view of the dual-hinged center console of the present invention taken along sight line 3—3 of FIG. 1;

FIG. 4 is a partial cut-away view of the dual-hinged center console of the present invention showing, in phantom, a latch handle, spring plunger, and a cam rod being actuated so that a lid is placed in an open position;

DESCRIPTION OF THE PREFERRED EMBODIMENT(S)

Figure 1:
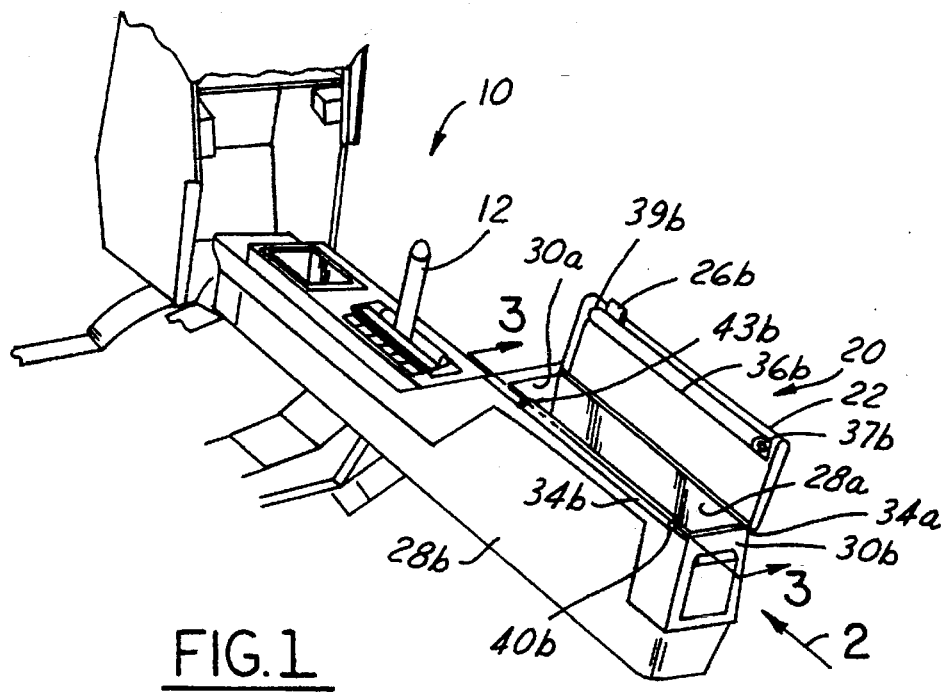
FIG. 1 is a perspective view of a dual-hinged center console of the present invention with a lid in an open position.
Figure 2:
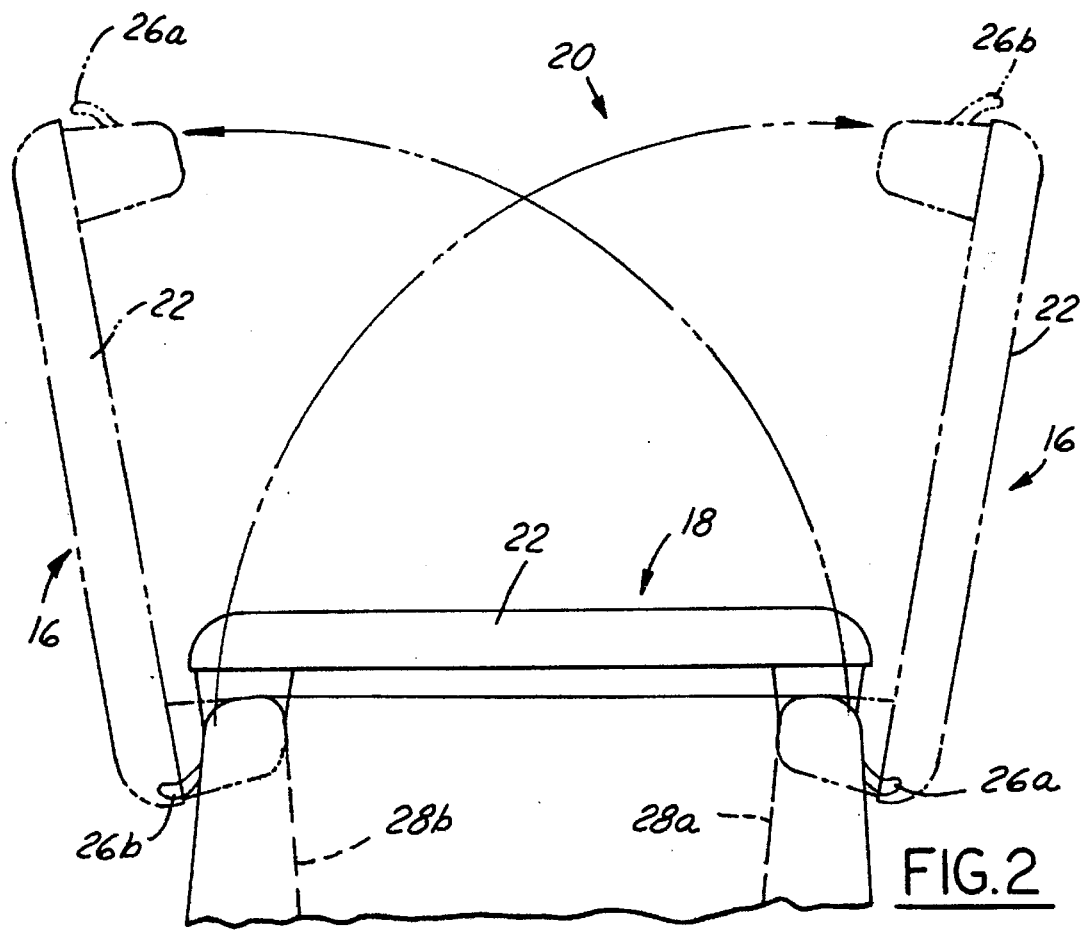
FIG. 2 is a partial side elevational view of the dual-hinged center console of the present invention shown in a closed position and in the open position from either side.

Commencing with FIG. 1, an instrument console 10 of a vehicle is shown. A gear stick shift 12 extends through the instrument console 10. A dual-hinged center console 20 is also shown that has a bottom portion 32, two side walls 28a, 28b, a front wall 30a, a back wall 30b, and a lid 22. As shown in FIG. 2, the lid 22 is hingedly attached to each side wall 28a, 28b in a closed position 18 and is adapted so that when it is in an open position 16, the lid 22 is hinged to only one side wall 28a or 28b. As seen in FIG. 3, the two side walls 28a, 28b, the front wall 30a, and the back wall 30b extend upwardly from the bottom portion 32 and are interconnected to form an enclosure for storing articles. It is understood by those skilled in the art that the present center console 20 is identical on each side. Therefore, the invention will be discussed with specific reference to the components on left side of the center console 20 looking from the rear of the center console 20 with the understanding that the like components on the other side of the center console 20 are identical.

As best seen in FIG. 1, the center console 20 also has a retention member 43b disposed in side wall 28b adjacent to the lid 22 at front wall 30a and an opposing resilient plunger 40b disposed in side wall 28b and adjacent to the lid 22 at rear wall 30b. Referring to FIGS. 3 and 4, in a preferred embodiment, the resilient plunger 40b is a spring loaded plunger that has a plunger bearing 41b and a spring 42b that is disposed between side wall 28b of the center console 20 and the plunger beating 41b. The spring 42b urges the plunger bearing 41b away from the back wall 30b. Side wall 28a has a like retention member and opposing resilient plunger (not shown).

Referring to FIG. 3, the center console 20 also includes longitudinally extending cam rod retention cavities 34a, 34b disposed within side walls 28a, 28b respectively adjacent to the lid 22. The cam rod retention cavity 34b is in axial alignment with, and disposed between, the resilient plunger 40b and the retention member 43b in side wall 28b. Further, a cam rod 36b is rotatably mounted on each side of the lid 22 adjacent to the side walls 28a, 28b of the center console 20. The cam rod 36b has a projection end 37b for abutting against the resilient plunger 40b and a rounded end 39b opposite the projection end 37b.

When the lid 22 is in the closed position 18, each cam rod 36a, 36b is disposed in a corresponding cam rod retention cavity 34a, 34b. When the lid 22 is in the open position 16, only one cam rod 36a or 36b is disposed in one corresponding cam rod retention cavity 34a or 34b. Each cam rod 36a, 36b has a latch handle 26a, 26b that is attached at one end of the cam rod 36a, 36b. As best shown in FIG. 3 with respect to side wall 28b, a latch handle retention port 38b is disposed in side wall 28b of the center console 20. The handle retention port 38b allows a vehicle occupant to easily grab the latch handle 26b. In the preferred embodiment, the retention member 43b is a hollowed out cam rod receiving receptacle, but it is understood that the retention member 43b could also be helically threaded such that it could mate with opposing threads that could be disposed on the cam rod rounded end 39b.

In exemplary operation, as best seen in FIG. 4, the cam rod 36b performs the simultaneous function of unseating the resilient plunger 40b and retracting from the retention member 43b when the attached latch handle 26b is upwardly rotated by a vehicle operator. The lid 22 can then be rotated about cam rod 36a toward the open position 16. The center console 20 further includes screw cams 46a, 46b that are disposed in each cam rod retention cavity 34a, 34b thereby allowing each cam rod 36a, 36b to be removed from respective cam rod retention cavities 34a, 34b when the latch handle 26a, 26b is upwardly rotated.

Figure 5:
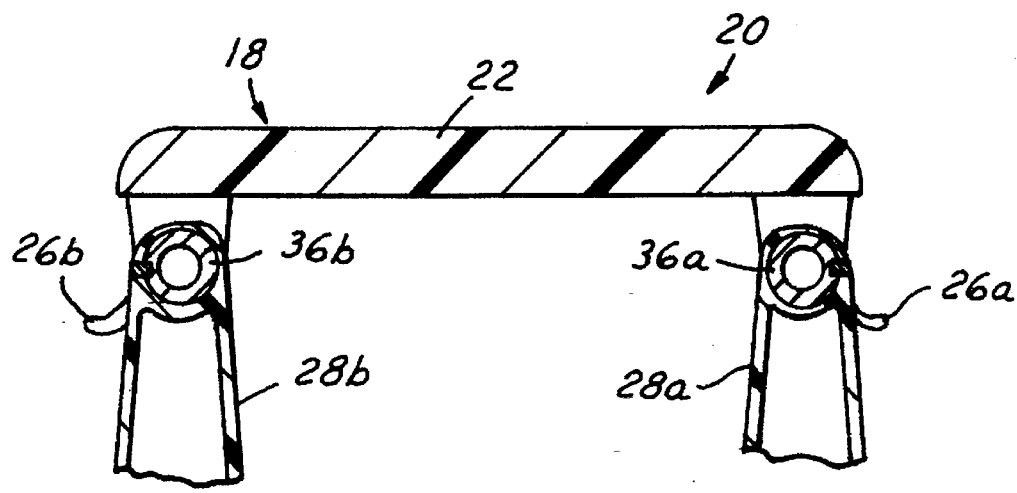
FIG. 5 is a cross-sectional view of the dual-hinged center console of the present invention taken along sight line 5—5 of FIG. 4.
Figure 6:
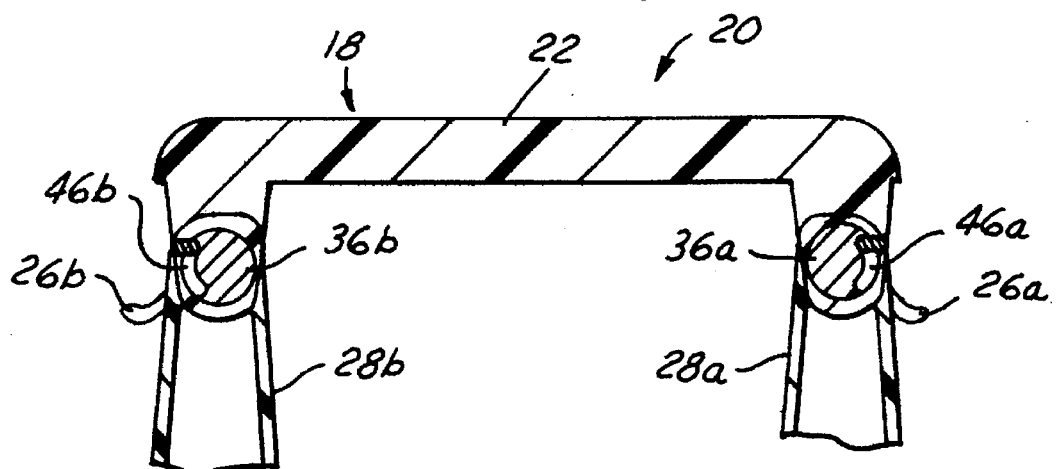
FIG. 6 is a cross-sectional view of the dual-hinged center console of the present invention taken along sight line 6—6 of FIG. 4.
Figure 7:
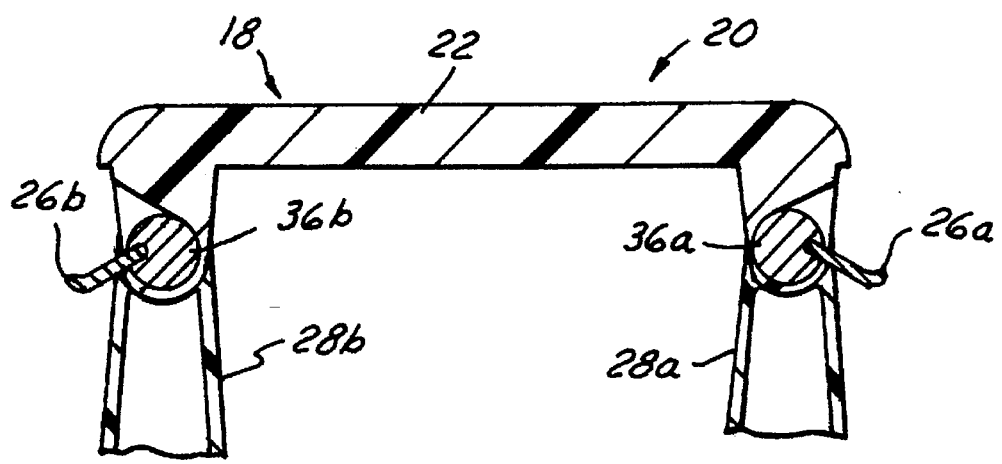
FIG. 7 is a cross-sectional view of the dual-hinged center console of the present invention taken along sight line 7—7 of FIG. 4.

In FIG. 5 a cross section of cam rods 36a, 36b is shown with the latch handles 26a, 26b and lid 22 is in a closed position 18. FIG. 6 shows another cross section of the cam rods 36a, 36b taken at the middle of the cam rod 36a, 36b and showing a cross section of the screw cam 46a, 46b when the latch handle 26a, 26b and lid 22 is in a closed position 18. While FIG. 7 shows a cross section of the cam rod 36a, 36b and attached latch handle 26a, 26b when the latch handle 26a, 26b and lid 22 is in a closed position 18. It is understood that the cam rods 36a, 36b could also be of a hollow, tubular design.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A dual-hinged center console comprising:

a bottom portion, two side walls, a front wall, a back wall, and a lid hingedly attached to each side wall in a closed position and adapted to be opened from either side so that when in an open position, the lid is hingedly attached to only one of the two side walls, the two side walls, the front wall, and the back wall extending upwardly from the bottom portion and being interconnected to form an enclosure for storing articles;

two retention members, each disposed in one of the side walls adjacent to the lid;

two longitudinally extending cam rod retention cavities, each disposed in one of the side walls of the center console adjacent to the lid, each longitudinally extending cam rod retention cavity in axial alignment with one of the retention members;

two cam rods, each rotatably mounted in one side of the lid and received in one of the cam rod retention cavities when the lid is in the closed position, only one cam rod being disposed in one cam rod retention cavity when the lid is in the open position;

two screw cams, each disposed in one of the cam rod extension cavities for moving each cam rod from the cam rod retention cavity when the cam rod is rotated; and two latch handles, each cam rod having a latch handle attached at one end, one cam rod being retracted from the retention member when the attached latch handle is rotated to permit the lid to be rotated about the other cam rod toward the open position.

2. The dual-hinged center console of claim 1 wherein each retention member is helically threaded.

3. The dual-hinged center console of claim 1 wherein each retention member is a cam rod receiving receptacle.

4. A dual-hinged center console comprising:

a bottom portion, two side walls, a front wall, a back wall, and a lid hingedly attached to each side wall in a closed position and adapted to be opened from either side so that when opened, the lid is hingedly attached to only one of the side walls, the two side walls, the front wall, and the back wall extending upwardly from the bottom portion and being interconnected to form an enclosure for storing articles;

two resilient plungers, each disposed in one of the side walls adjacent to the lid;

two retention members, each disposed in one of the side walls adjacent to the lid and opposite one of the resilient plungers;

two longitudinally extending cam rod retention cavities, each disposed within the center console adjacent to the lid, each of the longitudinally extending cam rod retention cavities in axial alignment with, and disposed between, one of the resilient plungers and the retention member in each side wall;

two cam rods, each rotatably mounted in one side of the lid and received in one of the retention cavities when the lid is in the closed position;

two screw cams, each disposed in one of the cam rod extension cavities for moving each cam rod from the cam rod retention cavity when the cam rod is rotated; and two latch handles, each cam rod having a latch handle attached at one end, one cam rod being retracted from the retention member when the attached latch handle is rotated to permit the lid to be rotated about the other cam rod toward the open position.

5. The dual-hinged center console of claim 4 wherein each retention member is helically threaded.

6. The dual-hinged center console of claim 4 wherein each retention member is a cam rod receiving receptacle.

7. A dual-hinged center console comprising:

a bottom portion, two side walls, a front wall, a back wall, and a lid hingedly attached to each side wall in a closed position and adapted to be opened from either side so that when opened, the lid is hingedly attached to only one of the two side walls, the two side walls, the front wall, and the back wall extending upwardly from the bottom portion and being interconnected to form an enclosure for storing articles;

two spring loaded plungers, each disposed in one of the side walls adjacent to the lid;

two cam rod receiving receptacles, each disposed in one of the side walls adjacent to the lid and opposite one of the spring loaded plungers;

two longitudinally extending cam rod retention cavities, each disposed within the center console adjacent to the lid, each of the longitudinally extending cam rod retention cavities in axial alignment with, and disposed between, one of the spring loaded plungers and one of the cam rod receiving receptacles in each side wall;

two cam rods rotatably mounted in one side of the lid and received in one of the retention cavities when the lid is in the closed position, only one cam rod being disposed in one cam rod retention cavity when the lid is in the open position;

two screw cams, each disposed in one of the cam rod extension cavities for moving each cam rod from the cam rod retention cavity by simultaneously rotating and sliding the cam rod in one direction; and two latch handles, each cam rod having a latch handle attached at one end, the cam rod performing the simultaneous function of unseating one of the spring loaded plungers and retracting from one of the cam rod receiving receptacles when the attached latch handle is upwardly rotated to permit the lid to be rotated about the other cam rod toward the open position.

* * * * *